(12) United States Patent
Zhang et al.

(10) Patent No.: US 9,908,074 B2
(45) Date of Patent: Mar. 6, 2018

(54) METHOD AND DEVICE FOR CONTROLLING PURIFICATION OF AIR

(71) Applicant: Xiaomi Inc., Beijing (CN)

(72) Inventors: Bin Zhang, Beijing (CN); Jun Su, Beijing (CN); Yongfeng Xia, Beijing (CN); Yunlin Hu, Beijing (CN); Yang Wang, Beijing (CN); Hao Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 240 days.

(21) Appl. No.: 14/792,834

(22) Filed: Jul. 7, 2015

(65) Prior Publication Data
US 2016/0121255 A1 May 5, 2016

Related U.S. Application Data

(63) Continuation of application No. PCT/CN2015/072039, filed on Jan. 30, 2015.

(30) Foreign Application Priority Data

Oct. 29, 2014 (CN) .......................... 2014 1 0596709

(51) Int. Cl.
*B01D 46/44* (2006.01)
*B01D 46/46* (2006.01)
*F24F 11/00* (2018.01)

(52) U.S. Cl.
CPC .......... *B01D 46/442* (2013.01); *B01D 46/46* (2013.01); *F24F 11/0017* (2013.01); *F24F 2011/0023* (2013.01)

(58) Field of Classification Search
CPC ...... B01D 46/44; B01D 46/442; B01D 46/46; F24F 11/0017; F24F 2011/0023; F24F 2011/0063

USPC .................................................... 96/417, 424
See application file for complete search history.

(56) References Cited

U.S. PATENT DOCUMENTS

2002/0078830 A1 6/2002 Chung et al.
2012/0247326 A1 10/2012 Storm

FOREIGN PATENT DOCUMENTS

| CN | 1629550 | A | 6/2005 |
|---|---|---|---|
| CN | 200972223 | Y | 11/2007 |
| CN | 103394247 | A | 11/2013 |
| CN | 103402555 | A | 11/2013 |
| CN | 103727589 | A | 4/2014 |
| CN | 103836775 | A | 6/2014 |
| CN | 103900197 | A | 7/2014 |

(Continued)

OTHER PUBLICATIONS

Machine translation of JP 2009262020, published Nov. 12, 2009.*
(Continued)

*Primary Examiner* — Robert Clemente
(74) *Attorney, Agent, or Firm* — Finnegan, Henderson, Farabow, Garrett & Dunner LLP (57) ABSTRACT

A method for controlling purification of air, includes: acquiring a target quality of air to be purified; determining a current quality of the air to be purified, and determining a workload for an air purifier according to the target quality and the current quality; calculating a purification duration for the air purifier to complete the workload according to a purification efficiency of the air purifier; and starting the air purifier, and displaying in real time a remaining time to complete the workload according to the purification duration.

11 Claims, 7 Drawing Sheets

(56) References Cited

FOREIGN PATENT DOCUMENTS

| CN | 103954004 A | | 7/2014 |
|---|---|---|---|
| CN | 103994544 A | | 8/2014 |
| CN | 104048387 A | | 9/2014 |
| CN | 104075422 A | * | 10/2014 |
| CN | 104101056 A | | 10/2014 |
| EP | 1 990 080 A1 | | 11/2008 |
| JP | H 09112995 A | | 5/1997 |
| JP | 2000177379 A | | 6/2000 |
| JP | 2000356407 A | | 12/2000 |
| JP | 2006290245 A | | 10/2006 |
| JP | 2009262020 A | * | 11/2009 |
| WO | WO 2011/128712 | | 10/2011 |

OTHER PUBLICATIONS

Machine translation of CN 104075422, published Oct. 1, 2014.*
Decision of Refusal in counterpart Japanese Application No. 2016-555892, dated Apr. 25, 2017.
Notification of Reason for Refusal in counterpart Korean Application No. 10-2015-7010189, dated Mar. 31, 2017.
Notification of Reasons for Refusal in counterpart Japanese Application No. 2016-555892, dated Nov. 25, 2016.
Notification of Reason for Refusal in counterpart Korean Application No. 10-2015-7010189, dated Sep. 23, 2016.
Office Action in counterpart Chinese Application No. 201410596709.2, dated Aug. 16, 2016 and English translation thereof.
Notification of Reason for Refusal in counterpart Korean Application No. 10-2015-7010189, dated Mar. 3, 2016.
Extended Search Report for European Application No. 15191507.1 from the European Patent Office, dated Mar. 3, 2016.
International Search Reportof PCT Application No. PCT/CN2015/072039, dated Aug. 5, 2015, issued by the ISA/CN—State Intellectual Property Office of the P.R. China.
Written Opinion of the International Searching Authority in International Application No. PCT/CN2015/072039, dated Aug. 5, 2015, issued by the ISA/CN—State Intellectual Property Office of the P.R. China.

* cited by examiner

METHOD AND DEVICE FOR CONTROLLING PURIFICATION OF AIR

CROSS-REFERENCE TO RELATED APPLICATIONS

This application is a continuation application of International Application No. PCT/CN2015/072039, filed Jan. 30, 2015, which is based upon and claims priority to Chinese Patent Application No, 201410596709.2, filed Oct. 29, 2014, the entire contents of all of which are incorporated herein by reference.

TECHNICAL FIELD

The present disclosure generally relates to the field of smart terminals and, more particularly, to a method and a device for controlling purification of air.

BACKGROUND

Particulate matter, or PM, is the term for particles found in the air including, e.g., dust, dirt, soot, smoke, and liquid droplets. PM2.5 generally refers to particles with a diameter less than or equal to 2.5 micrometers, and may have a significant impact on air quality, visibility, etc. For example, PM2.5 may be suspended in the air for a long time, and the higher the concentration of PM2.5 in the air, the more severe the air pollution is.

Conventionally, air purifiers may be used to reduce PM2.5 in the air.

SUMMARY

According to a first aspect of the present disclosure, there is provided a method for controlling purification of air, comprising: acquiring a target quality of air to be purified; determining a current quality of the air to be purified, and determining a workload for an air purifier according to the target quality and the current quality; calculating a purification duration for the air purifier to complete the workload according to a purification efficiency of the air purifier; and starting the air purifier, and displaying in real time a remaining time to complete the workload according to the purification duration.

According to a second aspect of the present disclosure, there is provided a device for controlling purification of air, comprising: a processor; and a memory for storing instructions executable by the processor; wherein the processor is configured to: acquire a target quality of air to be purified; determine a current quality of the air to be purified, and determine a workload for an air purifier according to the target quality and the current quality; calculate a purification duration for the air purifier to complete the workload according to a purification efficiency of the air purifier; and start the air purifier, and display in real time a remaining time to complete the workload according to the purification duration.

According to a third aspect of the present disclosure, there is provided a non-transitory computer-readable storage medium having stored therein instructions that, when executed by a processor of a device, cause the device to perform a method for controlling purification of air, the method comprising: acquiring a target quality of air to be purified; determining a current quality of the air to be purified, and determining a workload of an air purifier according to the target quality and the current quality; calculating a purification duration for the air purifier to complete the workload according to a purification efficiency of the air purifier; and starting the air purifier, and displaying in real time a remaining time to complete the workload according to the purification duration.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
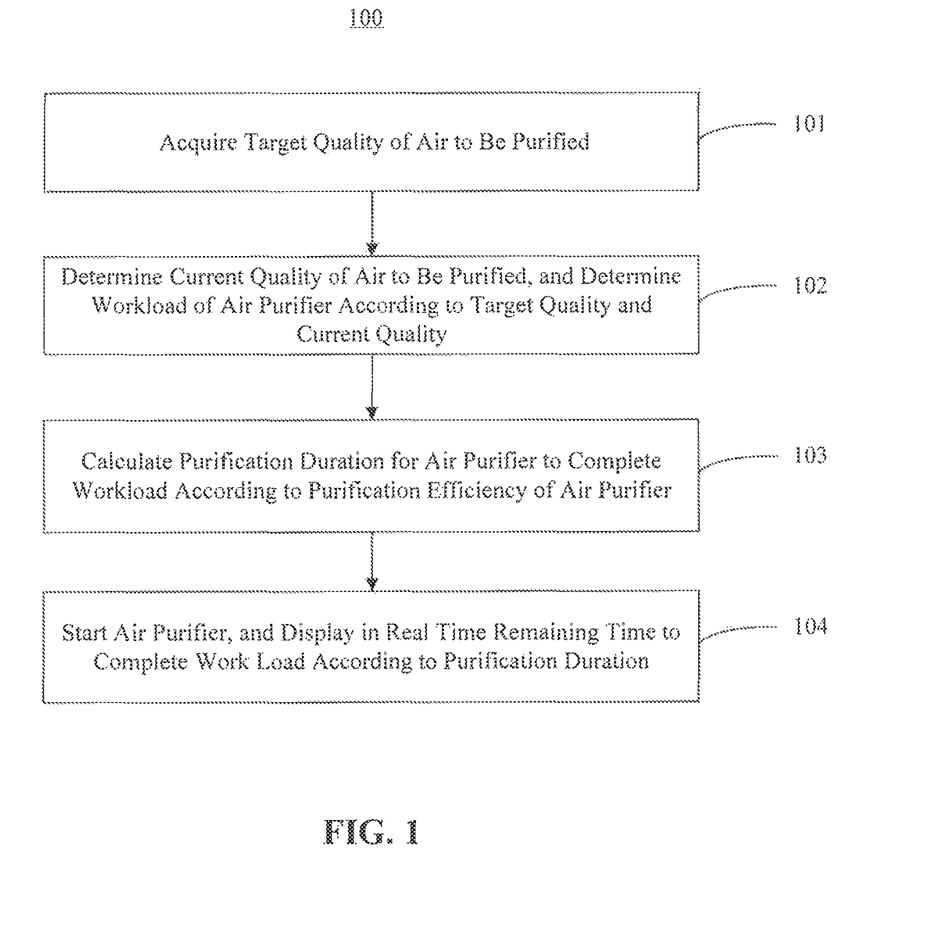
FIG. 1 is a flow chart of a method for controlling purification of air, according to an exemplary embodiment.

FIG. 1 is a flow chart of a method 100 for controlling purification of air, according to an exemplary embodiment. Referring to FIG. 1, the method 100 includes the following steps.

In step 101, a target quality of air to be purified is acquired.

In exemplary embodiments, the target quality is an air quality after the purification of the air is completed. The air to be purified may be air in a room, a building, a designated space, etc.

In step 102, a current quality of the air to be purified is determined, and a workload of an air purifier is determined according to the target quality and the current quality.

In exemplary embodiments, a plurality of air quality index levels are used to indicate air quality. For example, the plurality of air quality index levels are set according to a concentration of PM2.5 in the air, and may include the followings levels: excellent, good, lightly polluted, moderately polluted, heavily polluted, and severely polluted.

In exemplary embodiments, the larger the difference between the target quality and the current quality, the larger the workload of the air purifier will be. For example, if the current quality of the air to be purified is lightly polluted, the workload of the air purifier to purify the air from the lightly polluted level to a good level is smaller than the workload of the air purifier to purify the air from the lightly polluted level to an excellent level.

In step 103, a purification duration for the air purifier to complete the workload is calculated according to a purification efficiency of the air purifier.

In exemplary embodiments, the purification efficiency may be a volume of the air which the air purifier can purify from the current quality to the target quality in a unit time. Correspondingly, the workload may be a total volume of the air to be purified from the current quality to the target quality.

In exemplary embodiments, the purification efficiency may be an amount of PM2.5 which the air purifier can purify in a unit time. Correspondingly, the workload may be a total amount of PM2.5 to be purified in purifying the air from the current quality to the target quality.

In step 104, the air purifier is started, and a remaining time to complete the workload is displayed in real time according to the purification duration.

For example, after the air purifier is started, a countdown is performed for the purification duration, and countdown information is displayed.

As described above, the plurality of air quality index levels are set according to a concentration of PM2.5 in the air, and may include the following levels: excellent, good, lightly polluted, moderately polluted, heavily polluted, and severely polluted.

In one exemplary embodiment, to facilitate the setting of the air quality index levels, a mapping table between an air quality index (AQI) and an AQI level is used, shown in Table 1.

TABLE 1

| AQI | 0-50 | 51-100 | 101-150 | 151-200 | 201-300 | >300 |
|---|---|---|---|---|---|---|
| AQI level | excellent | good | lightly polluted | moderately polluted | heavily polluted | severely polluted |

The AQI relates to the concentration of PM2.5. In one exemplary embodiment, a mapping table between the AQI and the concentration of PM2.5 is also used, shown in Table 2.

TABLE 2

| AQI | 0 | 50 | 100 | 150 | 200 | 300 | 400 | 500 |
|---|---|---|---|---|---|---|---|---|
| PM2.5 ($\mu g/m^3$) | 0 | 35 | 75 | 115 | 150 | 250 | 350 | 500 |

Accordingly, in exemplary embodiments, step 101 includes acquiring an air quality index level selected by a user and determining the air quality index level selected by the user as the target quality of the air to be purified. For example, if the user selects the excellent level, the air purifier determines that the air needs to be purified to a concentration of PM2.5 in a range of 0 to 35 $\mu g/m^3$.

Accordingly, step 102 includes acquiring a total volume of the air to be purified; and determining the workload according to the total volume and a difference between concentrations of PM2.5 of the air in the target quality and the current quality. The total volume of the air to be purified may be input by the user in advance, or may be estimated according to a historical purification record, but is not limited thereto.

In exemplary embodiments, step 103 includes: collecting a historical purification record of the air purifier that includes an air quality before purification, an air quality after purification, a purification start time point, and a purification end time point; and estimating the purification efficiency of the air purifier according to the historical purification record.

For example, it is assumed that there are four historical purification records about the process of purifying the air from the good level to the excellent level, which last for 15 minutes, 14 minutes, 16 minutes, and 15 minutes, respectively. Accordingly, the purification efficiency of the air purifier can be estimated as follows: $4/(15+14+16+15)=1/15$. When the air purifier purifies the air from the good level to the excellent level for a fifth time, it may be determined that the purification duration for this purification is 15 minutes.

In another embodiment, the purification efficiency of the air purifier may be determined according to a power of the air purifier and a purification capacity of a filter element in the air purifier, in which the purification efficiency is positively correlated to the power, and the purification efficiency is positively correlated to the purification capacity of the filter element.

Figure 2:
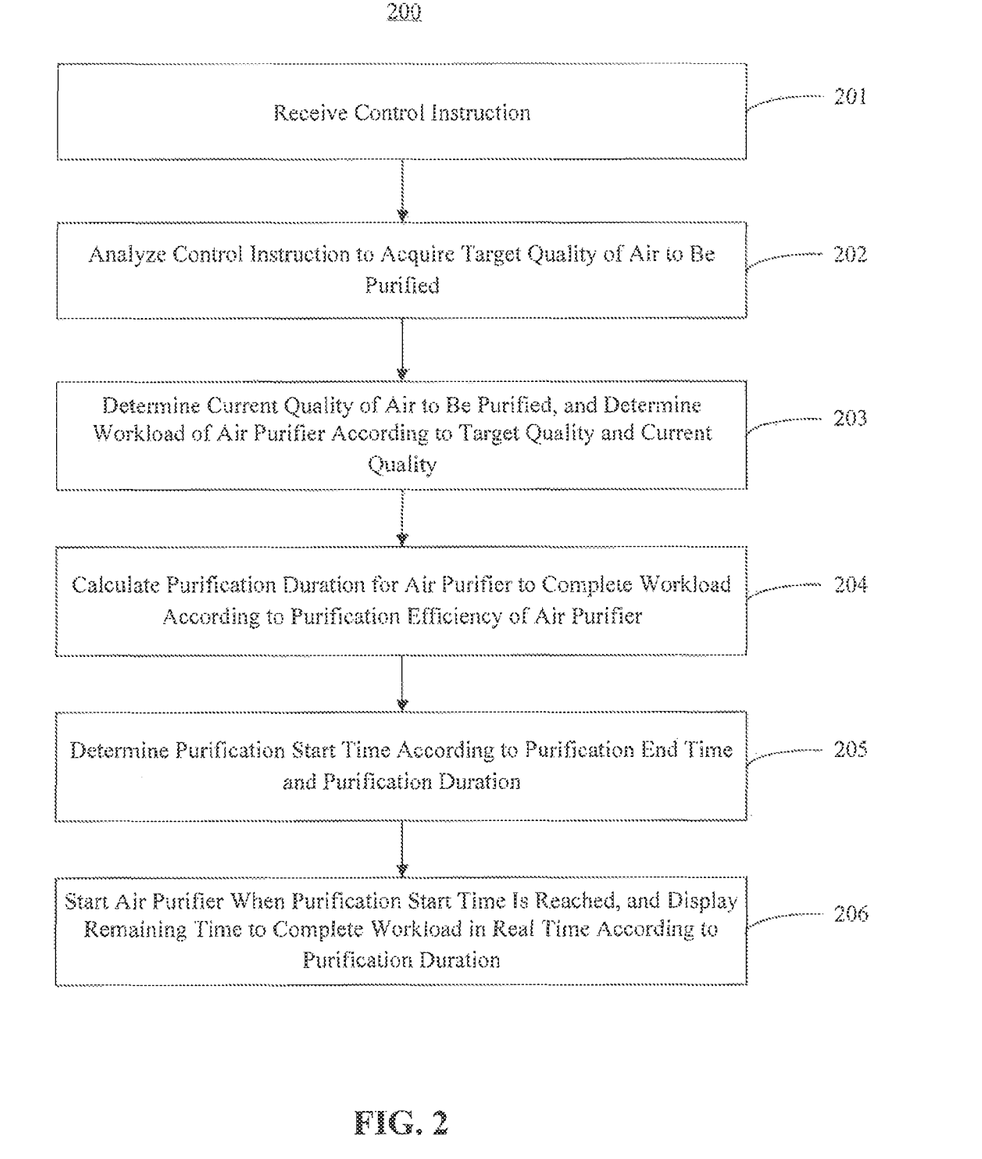
FIG. 2 is a flow chart of a method for controlling purification of air, according to an exemplary embodiment.

FIG. 2 is a flow chart of a method 200 for controlling purification of air, according to an exemplary embodiment. Referring to FIG. 2, the method 200 includes the following steps.

In step 201, a control instruction is received, e.g., from a terminal device, the control instruction including a target quality of the air to be purified and a purification end time. For example, the terminal device may be a portable device having a control function, such as a mobile phone, a tablet personal computer, or the like.

In step 202, the control instruction is analyzed to acquire the target quality of the air to be purified.

In step 203, a current quality of the air to be purified is determined, and a workload of an air purifier is determined according to the target quality and the current quality.

In step 204, a purification duration for the air purifier to complete the workload is calculated according to a purification efficiency of the air purifier.

In step 205, a purification start time is determined according to the purification end time and the purification duration.

In step 206, the air purifier is started when the purification start time is reached, and a remaining time to complete the workload is displayed in real time according to the purification duration.

For example, when a user reaches home at 20:00, an air quality in the user's home is at the good level. After the user selects the excellent level as the target quality, a purification duration for the air purifier to purify the air is determined to be, e.g., 30 minutes. Then the terminal device controls the air purifier to start at 19:30.

Figure 3:
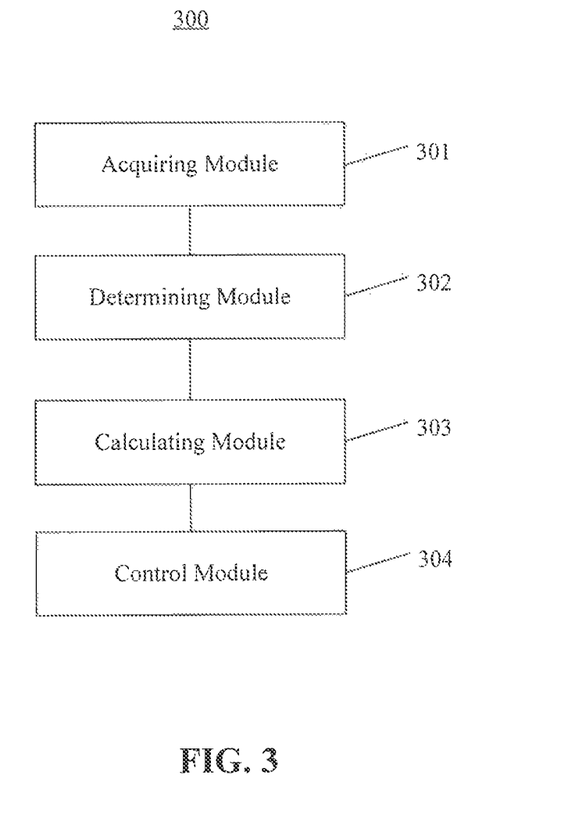
FIG. 3 is a block diagram of a device for controlling purification of air, according to an exemplary embodiment.

FIG. 3 is a block diagram of a device 300 for controlling purification of air, according to an exemplary embodiment. For example, the device 300 may be a part of an air purifier or a standalone device for controlling the air purifier. Referring to FIG. 3, the device 300 includes an acquiring module 301, a determining module 302, a calculating module 303, and a control module 304.

The acquiring module 301 is configured to acquire a target quality of air to be purified.

The determining module 302 is configured to determine a current quality of the air to be purified, and to determine a workload of the air purifier according to the target quality acquired by the acquiring module 301 and the current quality.

The calculating module 303 is configured to calculate a purification duration for the air purifier to complete the workload determined by the determining module 302, according to a purification efficiency of the air purifier.

The control module 304 is configured to start the air purifier, and to display in real time a remaining time to complete the workload according to the purification duration calculated by the calculating module 303.

Figure 4:
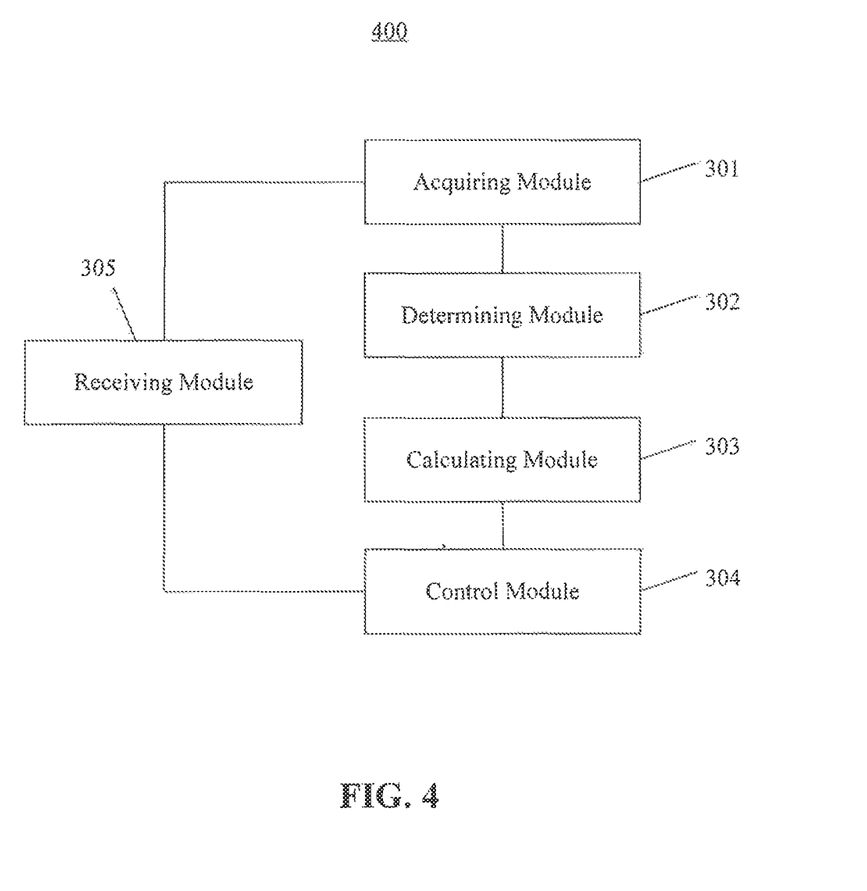
FIG. 4 is a block diagram of a device for purifying air, according to an exemplary embodiment.

FIG. 4 is a block diagram of a device 400 for controlling purification of air, according to an exemplary embodiment. For example, the device 400 may be a part of an air purifier or a standalone device for controlling the air purifier. Referring to FIG. 4, the device 400 includes a receiving module 305 in addition to the acquiring module 301, the determining module 302, the calculating module 303, and the control module 304 (FIG. 3).

The receiving module 305 is configured to receive from a terminal device a control instruction including the target quality of the air to be purified and a purification end time. The acquiring module 301 is further configured to analyze the control instruction received by the receiving module 305 to obtain the target quality of the air to be purified. The control module 304 is further configured to determine a purification start time according to the purification end time and the purification duration, and to start the air purifier when the purification start time is reached.

Figure 5:
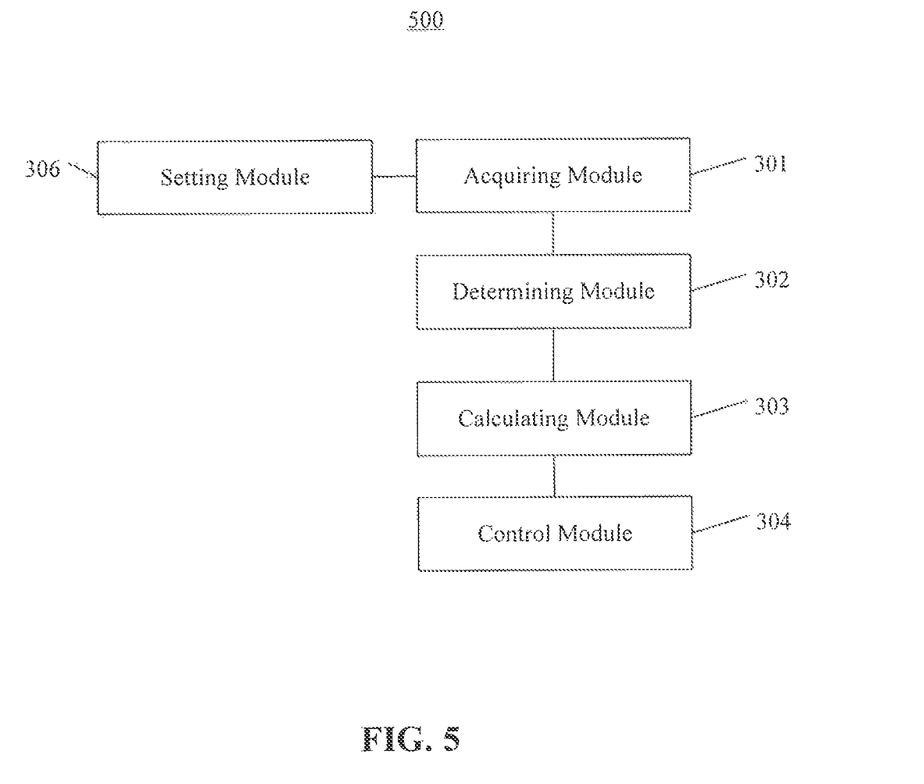
FIG. 5 is a block diagram of a device for purifying air, according to an exemplary embodiment.

FIG. 5 is a block diagram of a device 500 for controlling purification of air, according to an exemplary embodiment. For example, the device 500 may be a part of an air purifier or a standalone device for controlling the air purifier. Referring to FIG. 5, the device 500 includes a setting module 306 in addition to the acquiring module 301, the determining module 302, the calculating module 303, and the control module 304 (FIG. 3).

The setting module 306 is configured to set a plurality of air quality index levels according to a concentration of PM2.5 in the air. In one exemplary embodiment, the air quality index levels are set as follows: excellent, good, lightly polluted, moderately polluted, heavily polluted, and severely polluted. The acquiring module 301 is further configured to acquire an air quality index level selected by a user, and to determine the air quality index level selected by the user as the target quality of the air to be purified. The determining module 302 is further configured to acquire a total volume of the air to be purified; and to determine the workload according to the total volume and a difference between concentrations of PM2.5 of the air in the target quality and the current quality.

Figure 6:
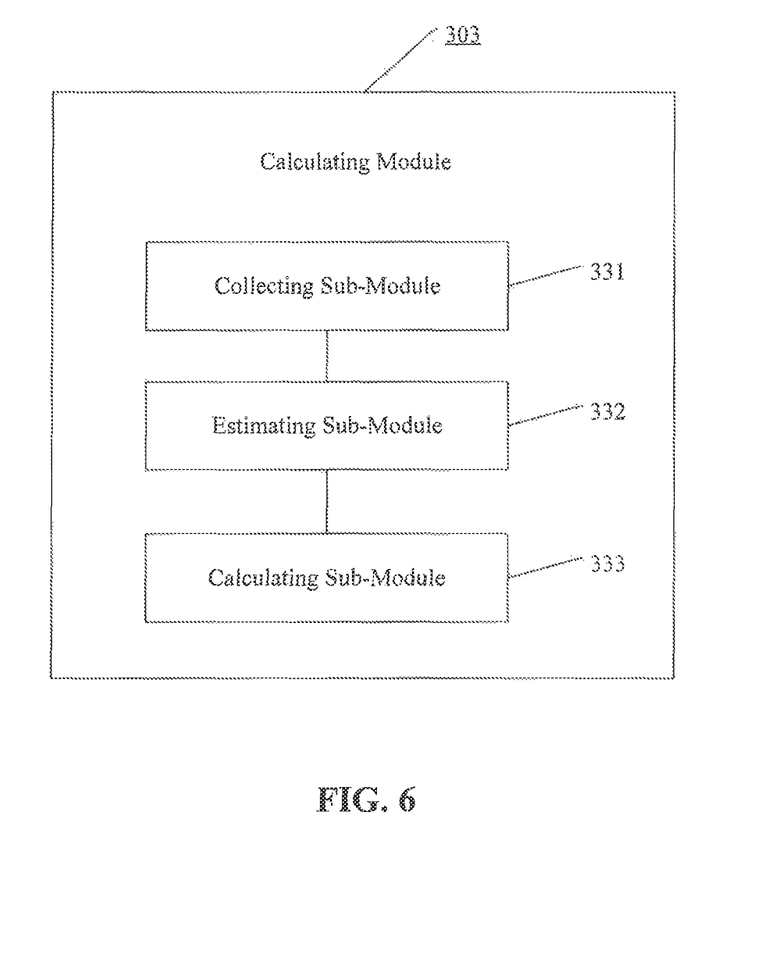
FIG. 6 is a block diagram of a calculating module, according to an exemplary embodiment.

FIG. 6 is a block diagram of the calculating module 303 (FIG. 3), according to an exemplary embodiment. Referring to FIG. 6, the calculating module 303 includes a collecting sub-module 331, an estimating sub-module 332, and a calculating sub-Module 333.

The collecting sub-module 331 is configured to collect one or more historical purification records of the air purifier that include an air quality before purification, an air quality after purification, a purification start time point, and a purification end time point. The estimating sub-module 332 is configured to estimate the purification efficiency of the air purifier according to the one or more historical purification records collected by the collecting sub-module 331. The calculating sub-module 333 is configured to calculate the purification duration for the air purifier to complete the workload according to the purification efficiency of the air purifier estimated by the estimating sub-module 332.

In another embodiment, the calculating module 303 is configured to determine the purification efficiency of the air purifier according to a power of the air purifier and a purification capacity of a filter element in the air purifier, in which the purification efficiency is positively correlated to the power, and the purification efficiency is positively correlated to the purification capacity of the filter element.

Figure 7:
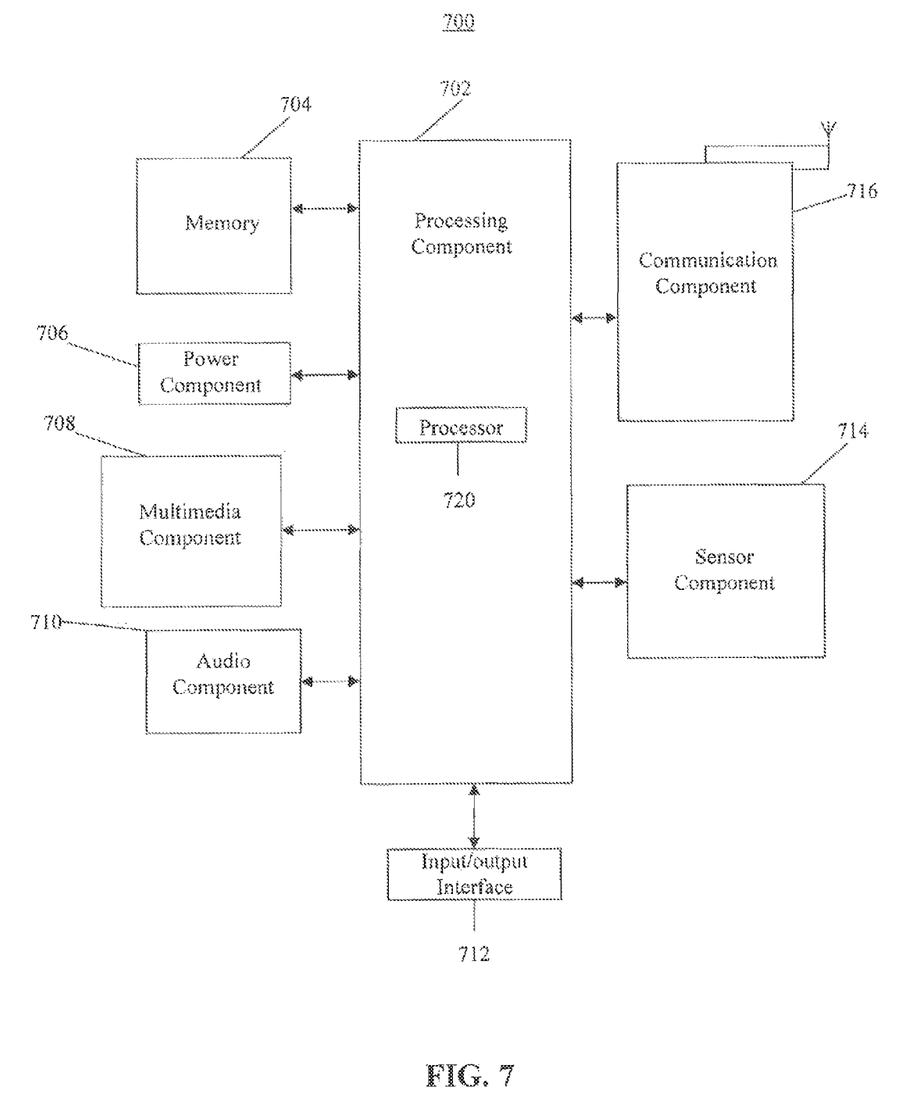
FIG. 7 is a block diagram of a device, according to an exemplary embodiment.

FIG. 7 is a block diagram of a device 700 for controlling purification of air, according to an exemplary embodiment. For example, the device 700 may be a mobile phone, a computer, a digital broadcast terminal, a message transceiver, a game console, a tablet, a medical device, an exercise equipment, a personal digital assistant, and the like.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user, in some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 708 includes a front camera and/or a rear camera. The front camera and the rear camera may receive external multimedia data while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700 and relative positioning of components (e.g., the display and the keypad of the device 700). The sensor component 714 may also detect a change in position of the device 700 or of a component in the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate wired or wireless communication between the device 700 and other devices. The device 700 can access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling purification of air, comprising:
   acquiring a target quality of air to be purified;
   determining a current quality of the air to be purified, and determining a workload for an air purifier according to the target quality and the current quality;
   calculating a purification duration for the air purifier to complete the workload according to a purification efficiency of the air purifier; and
   starting the air purifier, and displaying in real time a remaining time to complete the workload according to the purification duration,
   wherein the calculating of the purification duration comprises:
   collecting a historical purification record of the air purifier, wherein the historical purification record includes an air quality before purification, an air quality after purification, a purification start time point, and a purification end time point;
   estimating the purification efficiency of the air purifier according to the historical purification record; and
   calculating the purification duration for the air purifier to complete the workload according to the purification efficiency of the air purifier.

2. The method of claim 1, further comprising:
   receiving a control instruction including the target quality of the air to be purified and a purification end time;
   analyzing the control instruction to acquire the target quality of the air to be purified;
   determining a purification start time according to the purification end time and the purification duration; and
   starting the air purifier when the purification start time is reached.

3. The method of claim 1, further comprising:
   acquiring an air quality index level selected by a user; and
   determining the air quality index level selected by the user as the target quality of the air to be purified.

4. The method of claim 3, wherein determining the workload of the air purifier according to the target quality and the current quality comprises:
   acquiring a total volume of the air to be purified; and
   determining the workload according to the total volume and a difference between concentrations of PM2.5 of the air in the target quality and the current quality.

5. The method of claim 1, wherein the calculating of the purification duration comprises:
calculating the purification efficiency of the air purifier according to a power of the air purifier and a purification capacity of a filter element in the air purifier, wherein the purification efficiency is positively correlated to the power, and the purification efficiency is positively correlated to the purification capacity of the filter element.

6. A device for controlling purification of air, comprising:
a processor; and
a memory for storing instructions executable by the processor;
wherein the processor is configured to:
acquire a target quality of air to be purified;
determine a current quality of the air to be purified, and determine a workload for an air purifier according to the target quality and the current quality;
calculate a purification duration for the air purifier to complete the workload according to a purification efficiency of the air purifier; and
start the air purifier, and display in real time a remaining time to complete the workload according to the purification duration,
wherein, in calculating the purification duration, the processor is further configured to:
collect a historical purification record of the air purifier, wherein the historical purification record includes an air quality before purification, an air quality after purification, a purification start time point, and a purification end time point;
estimate the purification efficiency of the air purifier according to the historical purification record; and
calculate the purification duration for the air purifier to complete the workload according to the purification efficiency of the air purifier.

7. The device of claim 6, wherein the processor is further configured to:
receive a control instruction including the target quality of the air to be purified and a purification end time;
analyze the control instruction to obtain the target quality of the air to be purified;
determine a purification start time according to the purification end time and the purification duration; and
start the air purifier when the purification start time is reached.

8. The device of claim 6, wherein the processor is further configured to:
acquire an air quality index level selected by a user; and
determine the air quality index level selected by the user as the target quality of the air to be purified.

9. The device of claim 8, wherein the processor is further configured to:
acquire a total volume of the air to be purified; and
determine the workload according to the total volume and a difference between concentrations of PM2.5 of the air in the target quality and the current quality.

10. The device of claim 6, wherein the processor is further configured to:
determine the purification efficiency of the air purifier according to a power of the air purifier and a purification capacity of a filter element in the air purifier, wherein the purification efficiency is positively correlated to the power, and the purification efficiency is positively correlated to the purification capacity of the filter element.

11. A non-transitory computer-readable storage medium having stored therein instructions that, when executed by a processor of a device, cause the device to perform a method for controlling purification of air, the method comprising:
acquiring a target quality of air to be purified;
determining a current quality of the air to be purified, and determining a workload of an air purifier according to the target quality and the current quality;
calculating a purification duration for the air purifier to complete the workload according to a purification efficiency of the air purifier; and
starting the air purifier, and displaying in real time a remaining time to complete the workload according to the purification duration,
wherein the calculating of the purification duration comprises:
collecting a historical purification record of the air purifier, wherein the historical purification record includes an air quality before purification, an air quality after purification, a purification start time point, and a purification end time point;
estimating the purification efficiency of the air purifier according to the historical purification record; and
calculating the purification duration for the air purifier to complete the workload according to the purification efficiency of the air purifier.

* * * * *